Figure 1:
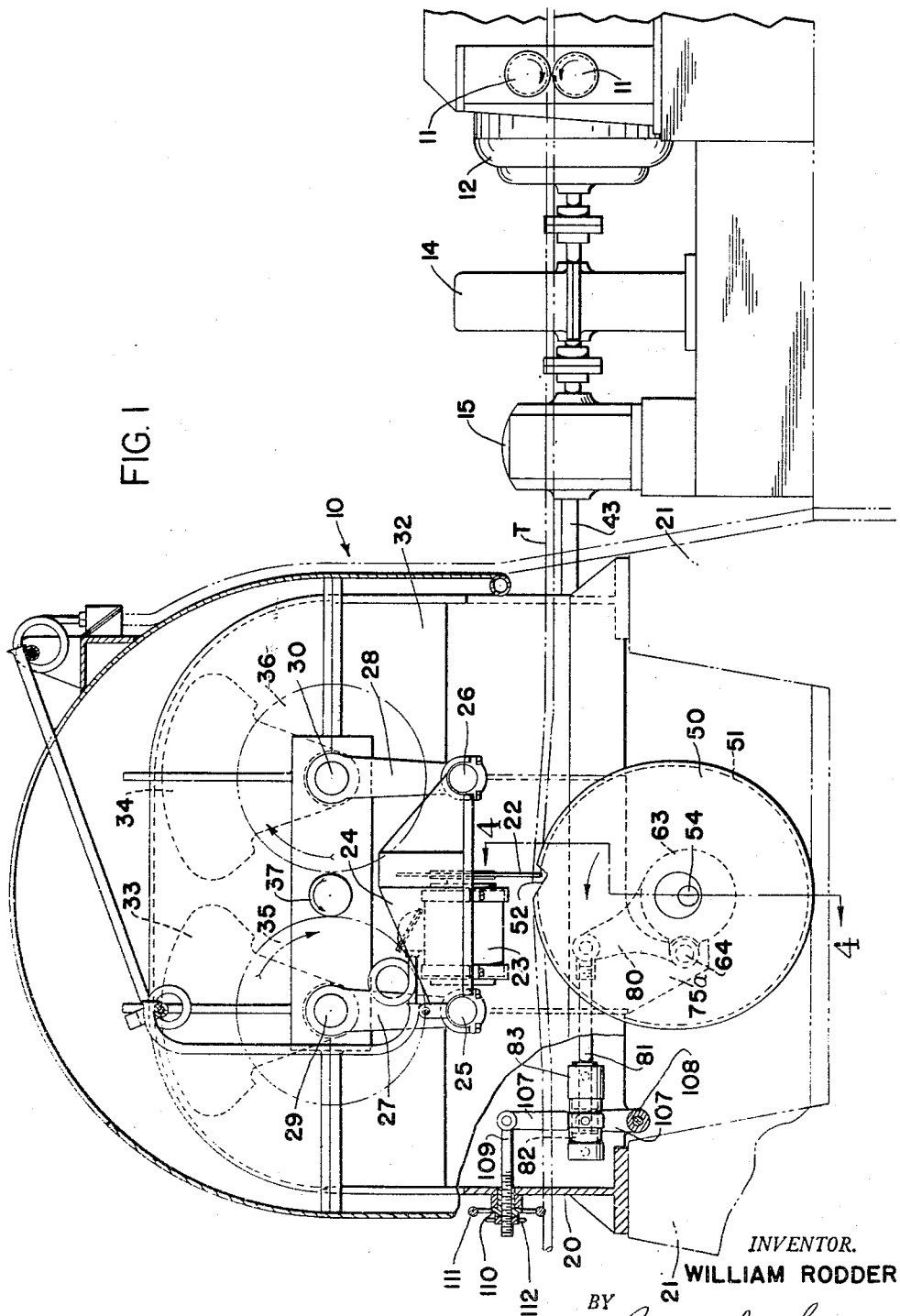

Nov. 9, 1954  W. RODDER  2,693,630
FLYING SAW

Filed Aug. 2, 1952  5 Sheets-Sheet 1

INVENTOR.
WILLIAM RODDER
BY Bosworth & Sessions
ATTORNEYS

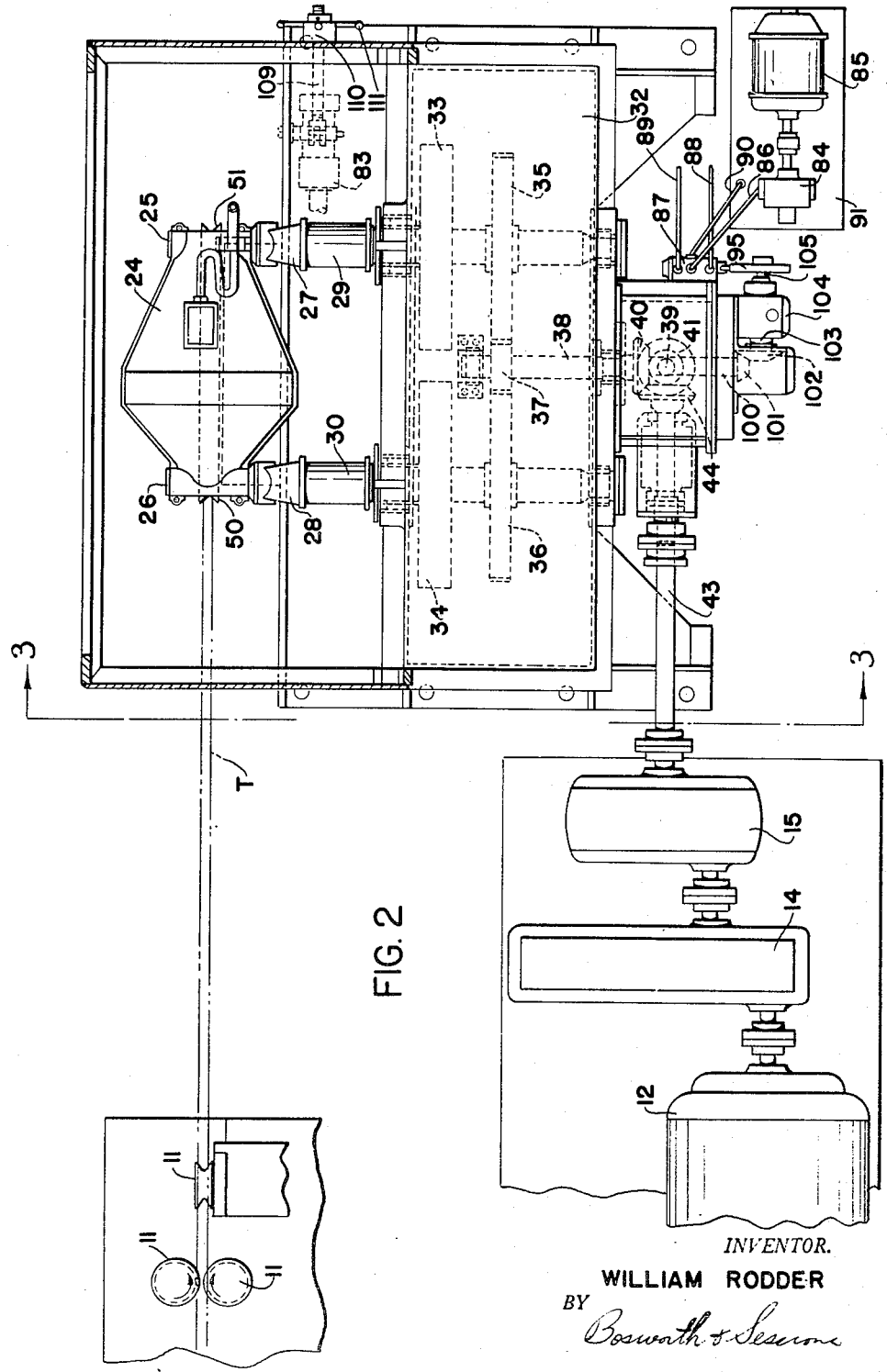

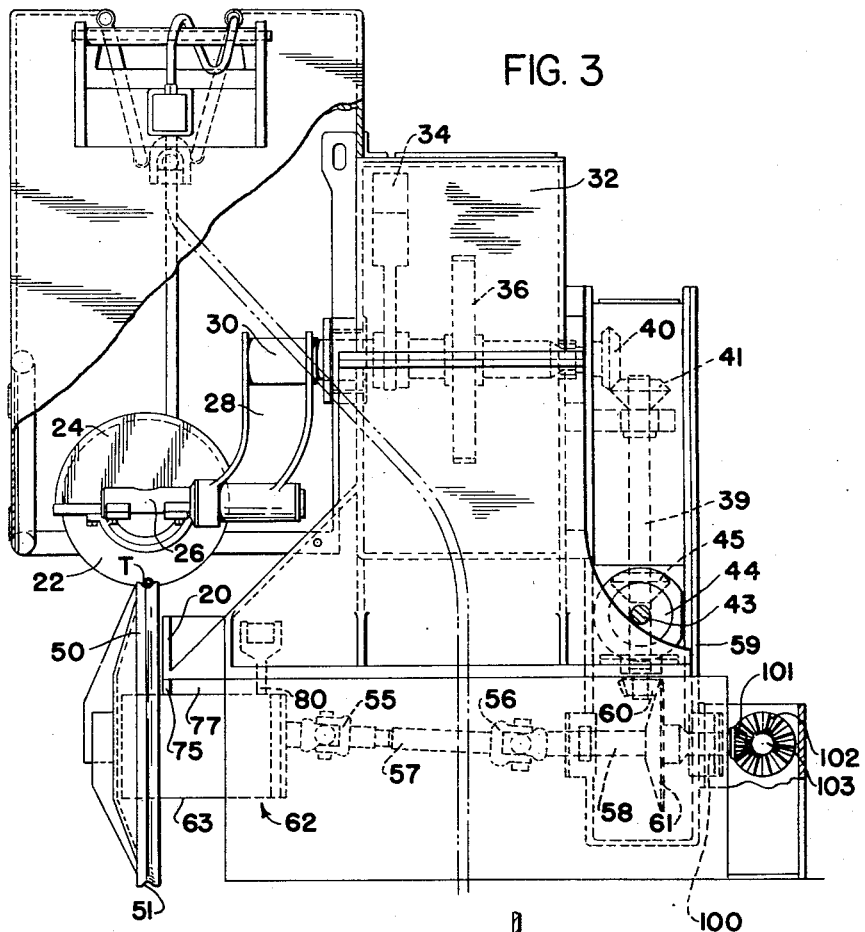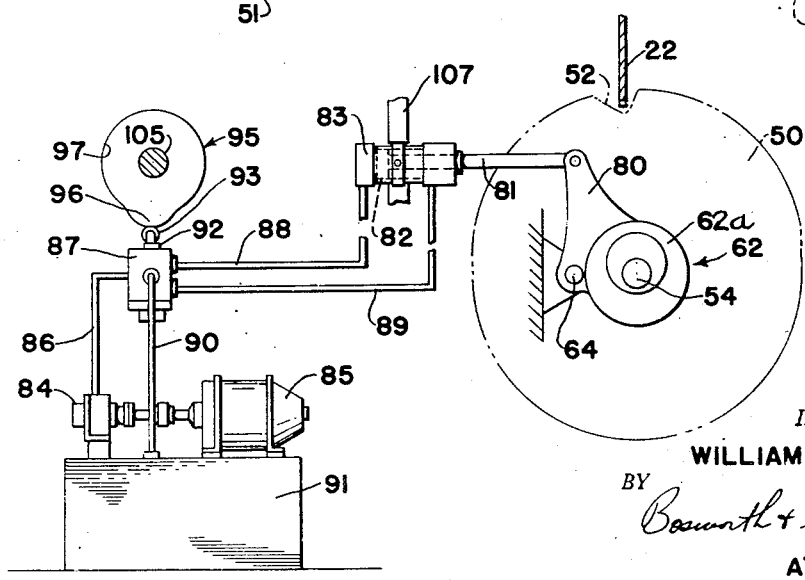

Nov. 9, 1954

W. RODDER 2,693,630

FLYING SAW

Filed Aug. 2, 1952

5 Sheets-Sheet 4

INVENTOR.
WILLIAM RODDER
BY
Bosworth & Sessions
ATTORNEYS

Nov. 9, 1954   W. RODDER   2,693,630
FLYING SAW

Filed Aug. 2, 1952   5 Sheets-Sheet 5

INVENTOR.
WILLIAM RODDER
BY Bosworth + Sessions
ATTORNEYS

United States Patent Office 2,693,630
Patented Nov. 9, 1954

2,693,630

FLYING SAW

William Rodder, Poland, Ohio, assignor to The Aetna-Standard Engineering Company, Pittsburgh, Pa., a corporation of Ohio Application August 2, 1952, Serial No. 302,319

22 Claims. (Cl. 29—69)

This invention relates to apparatus for cutting off successive lengths from continuously moving stock, and more particularly to flying saws for severing rapidly moving tubing, pipe, rod or the like into accurately cut lengths as the material emerges from a mill. The apparatus described herein is designed particularly for sawing welded pipe into lengths but it is to be understood that the invention has other uses and applications.

In the manufacture of steel pipe by a well-known process, skelp is heated to welding temperature in a furnace and then passed at high speed through forming and welding rolls in which the skelp is formed into tubular shape and the abutting edges welded together to for the pipe. The skelp is supplied in large coils and the forward end of one coil is welded to the trailing end of the preceding coil before the skelp enters the furnace, thus making it possible to carry on the welding operation for relatively long periods of time without interruption. Mills of this type operate at high rates of speed. It is therefore necessary to provide some sort of flying cut-off mechanism in order to cut the pipe into lengths as it emerges from the mill at speeds of, for example, as high as one thousand feet per minute.

A flying saw or cut-off that successfully meets the requirements of mills of this type is disclosed and claimed in my co-pending application, Serial No. 69,521, filed January 6, 1949, now Patent No. 2,645,001, issued July 14, 1953. The apparatus of my said co-pending application comprises a circular saw or other cutting tool which is carried by a crank mechanism in a circular path or orbit. Means are provided for guiding the work in a path disposed in a plane parallel to the plane of the circular path of rotation of the cutting tool, the direction of action of the cutting tool being perpendicular to the path of the work. The cutting tool is rotated by driving mechanism either mechanically or electrically synchronized with the driving mechanism of the mill so that the rotational movement of the tool is in timed relationship with the lineal speed of the work. The work is guided in a path which is normally adjacent to, but which does not intersect, the circular path of the cutting tool; means are provided, however, for periodically deflecting the work from its normal path into the path of the cutting tool thereby to sever the stock.

The present invention relates to an apparatus of the same general type as the apparatus disclosed in my aforesaid application but which has been improved in some respects and which is arranged to operate for long periods of time while cutting pipe into pieces of substantially equal length. The apparatus of the present invention is also adapted to cut very long lengths of pipe and has been simplified by the elimination of certain of the adjusting means described in my co-pending application.

Figure 4:
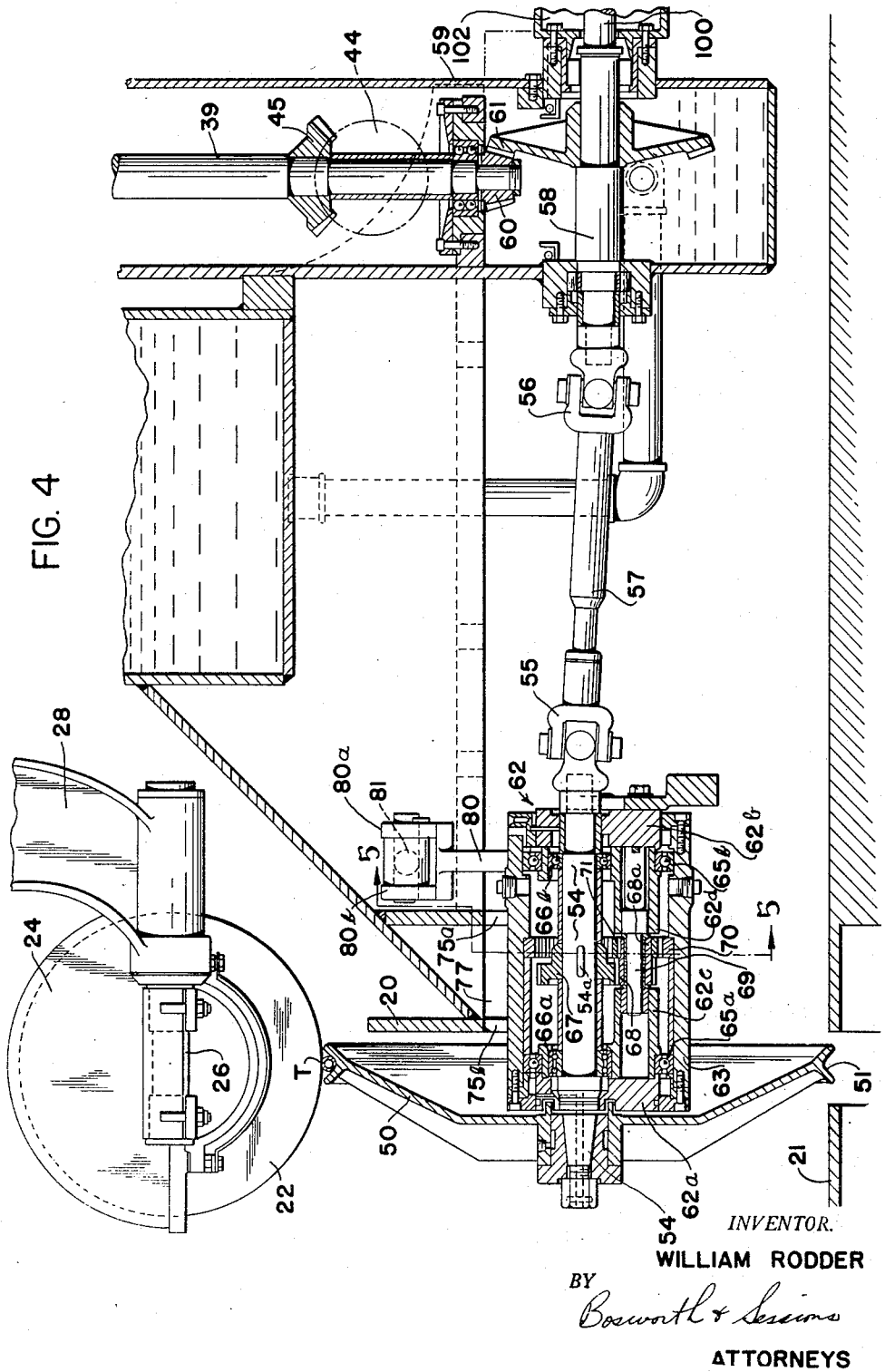
Figure 5:
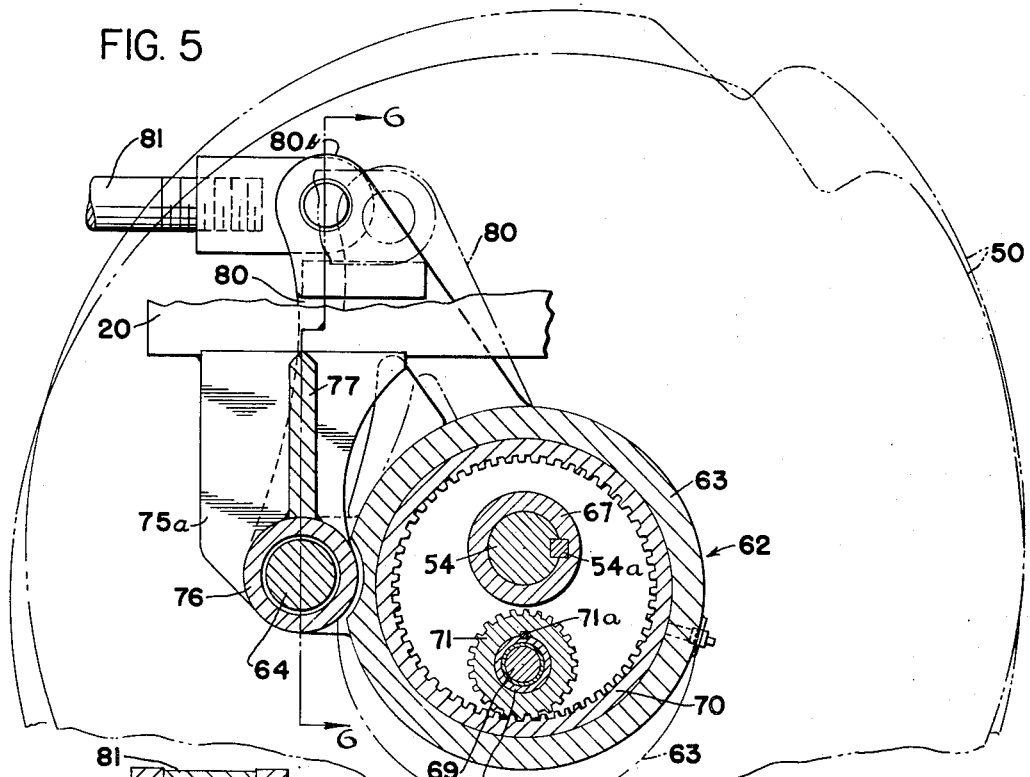
Figure 6:
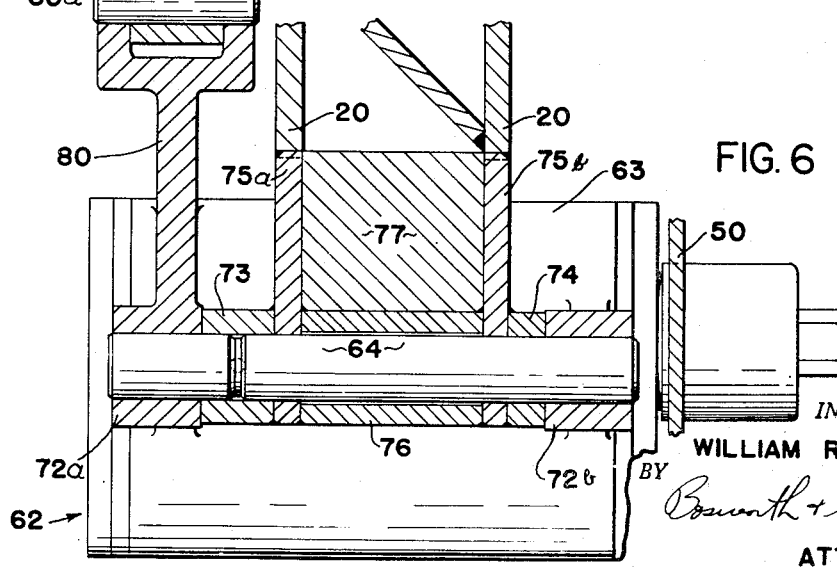

Referring now to the drawings, Figure 1 is a front elevational view of a preferred form of flying hot saw embodying the invention; Figure 2 is a plan view of the apparatus shown in Figure 1; Figure 3 is a side elevation of the apparatus shown in Figure 1 looking in the direction of movement of the pipe through the apparatus; Figure 4 is a sectional detail showing a portion of the drive mechanism of the apparatus; Figure 5 is a sectional detail showing the mechanism for operating the work deflecting cam, the section being taken along the line 5—5 of Figure 4; Figure 6 is a sectional detail of the same mechanism, the section being taken along the line 6—6 of Figure 5; and Figure 7 is a diagrammatic view illustrating the hydraulic mechanism for raising and lowering the work deflecting cam and its associated driving mechanism.

As shown particularly in Figures 1, 2 and 3, a flying hot saw made according to my invention and indicated in general at 10 is adapted to receive tubing or similar material T directly from a welding mill and to sever it into pieces of the desired length. In Figure 1 of the drawings a pair of rolls of the welding mill are indicated at 11, these rolls delivering the tube T to the flying hot saw 10. The mill is driven by motor 12 and preferably this motor is utilized to drive the flying hot saw through reduction gearing 14 and a P. I. V. (positive infinitely variable drive) 15.

The flying saw 10 comprises a suitable frame structure 20 preferably built up of welded steel plates and arranged to be supported upon a base such as the foundation structure indicated at 21 in Figure 1. The frame structure 20 carries the cutting tool which, in the present embodiment, is a circular saw 22. The saw 22 is driven by motor 23, the saw preferably being mounted directly on the motor shaft, and the saw and motor are supported in a carriage structure 24 which in turn is mounted upon crank pins 25 and 26 carried by crank arms 27 and 28 respectively, the crank arms being mounted on crank shafts 29 and 30 respectively. The carriage 24 is preferably constructed and arranged as described and claimed in my Patent No. 2,561,292, issued July 17, 1951.

The crank shafts 29 and 30 are supported by suitable bearings in the upwardly extending box-like portion 32 of the frame structure 20. The shafts are provided with counterbalances 33 and 34 and are driven in synchronism by gears 35 and 36 which are both engaged by the pinion 37 mounted on countershaft 38. Countershaft 38 is in turn driven by vertical shaft 39 through miter gears 40 and 41, the drive for the vertical shaft from the P. I. V. 15 being through shaft 43 and miter gears 44 and 45. Thus, with this arrangement, the saw 22 is carried in a circular orbital path by the crank arms 27 and 28, the speed of rotation of the saw in its orbital path being determined by the speed of the mill motor 12 and the adjustment of the P. I. V. 15. Thus, a definite relationship can be maintained between the speed of the tube T as it is delivered by the mill and the rotational speed of the saw in its orbit. This relationship is one of the factors controlling the length of cut of the apparatus.

As noted above, the path of the tube is normally adjacent to but does not intersect the path of the saw and in order to make the paths of the saw and tube intersect so that the saw can sever the tube, the work is periodically deflected into the path of the saw. This is accomplished by a cam 50 of non-circular shape having a grooved periphery for guiding the tube as indicated at 51, the cam being notched as at 52 at its high point so that the saw can sever the tube without cutting the peripheral portion of the cam.

The cam is rotated in synchronism with the crank arms 27 and 28 carrying the saw 22 in such manner that the notched high point of the cam coincides with the position of the saw when it is in its lowest position as shown in Figure 1. The cam 50 is rotated by means of a rotatable shaft 54 which is driven through universal joints 55 and 56 and the extensible shaft section 57 from a rotatable stub shaft 58 mounted in the gear box 59 forming a part of the frame structure 20. Stub shaft 58 is driven from vertical shaft 39 by means of bevel pinion 60 and bevel gear 61. The ratio of bevel pinion 60 to bevel gear 61 is the same as the ratio of pinion 37 to gears 35 and 36. Inasmuch as the miter gears 40 and 41 are of the same diameter it will be evident that the cam shaft 54 and cam 50 will be driven at the same rotational speed as the crank shafts 29 and 30 and crank arms 27 and 28 carrying the saw 22.

It will be apparent that the length of the cut made by the saw is equal to the speed of the tube in feet per minute divided by the number of cuts per minute. It is also evident that the lineal speed of the saw in its travel around its orbit must approximate the speed of the tube at the time that the cutting action takes place in order to obtain reasonably square ends and to avoid imposition of destructive and damaging forces on the saw. The lineal speed of the saw in its orbit is equal to the number of revolutions per minute made by the saw in its orbit times $2\pi r$ where $r$ equals the radius of the crank arms 27 and 28. Inasmuch as it is seldom desirable to cut pipe into lengths of less than about 20 feet and as it is frequently desirable to cut small pipe in particular into lengths of 80 or 100 feet, it is obviously impractical to construct a saw in which the saw makes a cut for every revolution in its orbit, for in such case if the speed of the saw is to approximate the speed of the work, then to cut a 20 ft. length of pipe would require crank arms having a length of more than three feet while to cut a 100 ft. length of pipe would require crank arms nearly 15 feet long. A saw embodying such a construction would be extremely costly to build and probably impractical because of the many constructional difficulties involved.

According to the present invention, the necessity for employing large crank arms is eliminated and a saw which is capable of cutting lengths of pipe within a wide range is provided by mounting the deflecting cam in such manner that it functions to deflect the work into the path of the saw not for every revolution of the saw in its orbit but only once in every 2, 3, 4 or more revolutions so that long lengths of pipe can be cut with a saw carried on crank arms of reasonable length and yet with the lineal speed of the saw closely approximating the lineal speed of the tube at the time that the cut is made.

This result is obtained by mounting the cam shaft 54 in an eccentric 62 (Figure 4) which rotates at only a fraction of the speed of the cam shaft itself so that the cam 50 is at its high point and hence capable of deflecting the tube into the path of the saw only once in every 2, 3 or more revolutions thereof depending upon the design of the apparatus and, in addition, by providing means for raising and lowering the entire eccentric and cam mechanism in timed relationship with the operation of the saw so that a still greater number of revolutions of the saw in its orbit can be permitted without any cutting action taking place.

The eccentric 62 for carrying the cam shaft 54 consists of a first end-piece 62a, a second end-piece 62b, and certain intervening elements, including two bearing supports 62c and 62d. Eccentric 62 is mounted within a housing 63 which is supported from a pivot pin 64 carried by the frame structure 20. As shown in Figure 4, eccentric 62 rotates within housing 63 on bearings 65a and 65b, while shaft 54 is mounted within eccentric 62 on bearings 66a and 66b. Shaft 54 carries a drive gear 67 which is keyed as at 54a to the shaft 54. Gear 67 drives an idler pinion 68 supported on a bearing sleeve on a stub shaft 69 which is supported as shown within eccentric 62 by means of bearing supports 62c and 62d. Positioned for meshing engagement with an internal gear 70 secured to the inner surface of housing 63 is a gear 71 keyed as at 71a (Figure 5) to the hub 68a of idler pinion 68. Rotation of shaft 54 therefore results in rotation of eccentric 62.

In the preferred embodiment of the invention shown in Figures 4 and 5, the relationship between the number of teeth of drive gear 67, pinion 68, gear 71, and internal gear 70 is such that eccentric 62 rotates at one-half the speed of shaft 54 and one-half the speed of cam 50.

With this arrangement the cam 50 is raised by eccentric 62 to a position in which it can lift the pipe or tube into the path of the saw once every other revolution of the cam. Inasmuch as the cam is driven at the same rotational speed as the crank arms 27 and 28, the saw makes a cut every other revolution. In a preferred form of apparatus, this permits cutting of pipe into lengths of from about 18 to 22 feet with crank arms having a radius of 20 inches. While the lineal speed of the saw during the cut varies from the speed of the tube, the variation is not great enough to cause serious difficulties, particularly when pipe of small diameter, for example, of the order of three-quarter inch standard pipe, is being cut. One reason for this is that because of the action of the cam in lifting the pipe into the path of the saw, the actual cutting operation occupies only about 9° of rotation of the saw in its orbit and, therefore, the cut is completed so quickly that the difference in lineal velocities of the saw and pipe does not result in a very great difference in the distances travelled by the saw and pipe during the cutting operation; hence, satisfactory cuts can be obtained and variations in length within the range of satisfactory operation can be produced simply by adjusting the drive ratio of the P. I. V., a reduction in the speed of rotation of the saw in its orbit as compared to the speed of travel of the pipe resulting in a greater length of cut and vice-versa.

In order to provide for cutting the pipe into lengths that are multiples of the lengths that can be cut with the saw making a cut every other revolution, means are provided for lowering the housing 63 by rotating it downwardly about pivot 64 to a position in which the lift of the eccentric is not great enough to enable the cam to raise the tube into the path of the saw. The mounting for the housing 63 is shown particularly in Figures 5 and 6. As there illustrated, the housing is provided with an integrally formed boss 72a adjacent one end thereof and an aligned boss 72b adjacent the other end thereof. Bosses 72a and 72b are bored to receive the pivot pin 64 which is supported in sleeve members 73 and 74, the sleeves 73 and 74 in turn being carried by plates 75a and 75b which are secured as by welding to the frame structure 20. A spacer sleeve 76 surrounds pin 64 between plates 75a and 75b and the supporting structure is given additional strength and rigidity by a web 77 which is welded to plates 75a and 75b and the spacer sleeve 76; thus, the eccentric housing 63 is supported on the pivot pin 64 and the entire housing may be raised and lowered by swinging it about the pivot 64.

In order to accomplish rotation of the housing 63 and thus raising and lowering of the eccentric 62 and the cam 50, the housing 63 is provided with a projecting bracket-like arm 80 which as seen from the side, as in Figure 6, is shaped like an inverted V. One leg thereof is secured at its lower end to housing 63 (Figure 5); the other leg thereof is secured at its lower end to boss 72a (Figure 6). A connecting rod 81 is pivotally mounted between the two arms 80a and 80b of a yoke at the upper end of arm 80. Connecting rod 81 extends to a piston 82 within the hydraulic cylinder 83, cylinder 83 being supported from the frame of the machine by a link 107 as shown in Figure 1. See also the diagrammatic representation in Figure 7.

It will be evident that when the piston 82 is moved in a direction toward or from the housing 63 the housing will be rotated about pivot 64 or hence raised and lowered with respect to the saw. Both raised and lowered positions are shown in Figure 5, the former in solid lines and the latter in dotted lines. The parts are proportioned so that when the piston 82 is at its extreme position toward the housing (to the right in Figures 1 and 7), the housing 63 is lowered a distance sufficient to prevent the cam 50 from lifting a pipe or tube into the path of the saw when the eccentric is at its highest position and when the piston 82 is at its extreme position away from the housing (to the left in Figures 1 and 7) then the housing is raised to normal operating position in which the cam can raise a pipe or tube into proper position to be cut by the saw when the eccentric raises the cam to its highest position. Thus, if the piston is held to the left in the embodiment shown, then the saw will cut the pipe once every other revolution. If, however, it is desired to cut longer lengths, hydraulic pressure may be supplied to the cylinder 83 to lower the housing 63, and so long as the housing remains in its lower position, the saw cannot cut the pipe.

In order to raise and lower the housing in timed relation to the rotation of the saw in its orbit, I preferably employ the mechanism shown particularly in Figures 2 and 7 for controlling the cylinder 83. Hydraulic fluid under pressure is supplied to cylinder 83 by pump 84 which is driven by motor 85. A conduit 86 leads from pump 84 to a 4-way valve 87 from which conduits 88 and 89 lead to opposite ends of the cylinder. Conduit 90 provides for return of hydraulic fluid to a sump or tank disposed within the supporting base 91. The arrangement is such that when the plunger 92 is in its innermost position as shown in the drawing, the valve 87 connects conduit 86 to conduit 89, thus supplying fluid under pressure to the cylinder 83 to move the piston 82 to the left in the embodiment shown in the drawings and thereby to raise the eccentric housing 63 about the pivot 64. In this position of the valve, the conduit 88 is connected to the conduit 90 so that as the piston 82 moves to the left, hydraulic fluid on the left-hand side of the piston can be discharged to the sump. When the plunger 92 is in its other position, i. e., extended position, the connections are reversed, fluid under pressure is supplied through conduit 88 to the left-hand end of cylinder 83 to swing the housing 63 downwardly about the pivot 64 while conduit 89 is connected to the return conduit 90 to permit discharge of fluid ahead of the piston 82 in its movement to the right.

In order to control the valve 87 in timed relation with the rotation of the saw in its orbit and the rotation of the cam 50, the plunger 92 is arranged to be moved inwardly by means of a cam 95 to a position in which the housing 63 is raised, the plunger being provided with a suitable roller 93 or other appropriate follower for engagement with the cam 95. When the high point 96 of the cam 95 engages the roller 93 as shown in the drawing, the housing 63 is raised to its uppermost position, and as the cam 95 rotates so that the circular portion 97 thereof engages the follower 93, the plunger is returned to its outermost position by spring means (not shown) within the valve 87 or other conventional means so that the connections to the cylinder 83 are reversed, the piston moved to the right-hand end of the cylinder, and the housing 63 moved to its lowermost position.

In order to drive the cam 95 in synchronism with the remainder of the apparatus, the shaft 58 is extended away from the deflecting cam 50 and the eccentric mechanism as shown at 100 in Figures 2, 3 and 4 and is provided at its end with a beveled gear 101 which meshes with a beveled gear 102 mounted on shaft 103. Gear 102 has twice as many teeth as gear 101. Hence, shaft 103 rotates at the speed of eccentric 62 and at half the speed of cam 50. As indicated in Figure 2, shaft 103 drives cam 95 through a conventional change speed gear box 104, the cam 95 being mounted upon the output shaft 105 of the gear box. The gear box 104 preferably includes a jaw clutch, so that the drive to the cam 95 can be disconnected, and gearing to provide speed ratios of, for example, 2, 3 and 4 to 1. With such a gear box, the cylinder 83 can be actuated in timed relationship with the rotation of deflecting cam 50 and of the saw in its orbit, cam 95 being positioned on shaft 105 so that the high point 96 of the cam 95 engages the follower 93 when the eccentric 62 is in its highest position.

With the jaw clutch disconnected so that the hydraulic mechanism is inoperative, and with the housing 63 in raised position, the cam 50 is raised into cutting position with each revolution of the eccentric 62 and every other revolution of the cam 50 and the saw; accordingly the saw cuts the pipe into minimum lengths. When it is desired to cut longer lengths of pipe, the clutch is engaged and the change speed gearing 104 is adjusted to the desired ratio. In the 2 to 1 ratio, the cam 95 operates the valve 87 to raise the eccentric housing 63 into cutting position once every other revolution of the eccentric 62 and once in every fourth revolution of the cam 50 and the saw. During the remainder of the time, the eccentric housing 63 is lowered sufficiently to prevent the eccentric 62 and cam 50 from raising the pipe into the path of the saw. When the change speed gear is set to the 3 to 1 ratio, the cam 95 operates the valve 87 to raise the housing 63 once in every three revolutions of the eccentric and once in every six revolutions of the cam 50 and saw. In the 4 to 1 ratio, the eccentric is raised into cutting position once in four revolutions of the eccentric or once in eight revolutions of the cam and saw. Thus, a setting of the P. I. V. 15 that will produce a length of cut of twenty feet when the hydraulic lifting mechanism is disengaged will produce cuts of 40, 60 and 80 feet respectively when the change speed gear 104 is set for 2 to 1, 3 to 1, and 4 to 1 ratios. It is evident, then, that the hydraulic lowering and lifting mechanism for the eccentric housing 63 gives a wide range of cutting lengths to the saw and in particular makes it possible to cut long lengths of material without requiring complicated gearing or excessively large crank arms for supporting the saw.

In order to adjust the position of the cam 50 for pipes of different diameter and to compensate for wear of the saw blade 22, the link 107 on which hydraulic cylinder 83 is mounted is pivoted to the frame structure 20 as indicated at 108 (Figure 1). The other end of link 107 is pivotally connected to a threaded link 109 which extends substantially at right angles to link 107 and engages a nut 110 which is rotatably mounted in the frame 20. Nut 110 is arranged to be rotated by hand wheel 111, and a locking nut 112 also engages the threaded link 109. By rotating the nut 110 to adjust the position of threaded link 109, the link 107 can be swung about its pivot and the cylinder 83 moved toward or away from the vertical center line of the eccentric housing 63. Thus, with the piston 82 to the left, in which position the eccentric housing 63 is raised to cutting position, the height of the cam 50 can be adjusted by means of the hand wheel 111 so that the saw will cut through the pipe or tube but not travel on into the rim of cam 50.

With apparatus of the kind above described, necessary adjustments can be made quickly and accurately; a wide range of lengths can be cut. The operation of the cam in deflecting the pipe into the path of the saw results in the severing of the pipe taking place very rapidly with the saw severing the pipe in a small fraction of a revolution and quickly moving again out of the path of the pipe. The speed of this operation is such that the difference in the distance traveled by the pipe and the distance traveled by the saw in a direction parallel to the pipe during the cutting operation is so small as to be negligible.

Those skilled in the art will appreciate that various changes and modifications can be made in my invention without departing from the spirit and the scope thereof. For example, the hydraulic lifting mechanism may be incorporated in a saw in which the radius of the crank arms is adjustable, as described and claimed in my co-pending application Serial No. 69,521, filed January 6, 1949, in which case it would be possible to cut any lengths of pipe from the minimum determined by the radius of the crank arms to whatever is desired. The apparatus can be adapted for other purposes and uses. It is intended that the patent shall cover, by suitable expression in the appended claims, whatever features of patentable novelty reside in the invention.

I claim:

1. Apparatus for severing successive longitudinal sections from continuously moving elongated work such as pipe, tube, rod and the like comprising a cutting tool; guides for guiding the work in a normal path; a rotary support for said cutting tool adapted to move said tool in an orbital path approaching but not intersecting the normal path of the work; a cam for periodically deflecting the work from its normal path into the path of the cutting tool; means including a shaft on which the cam is mounted for driving the cam at substantially the same rotational speed as but in the opposite angular direction from the rotary support for the cutting tool; an eccentric driven in synchronism with the rotary support for the cutting tool for periodically moving the cam shaft toward the path of the work to enable the cam to deflect the work into the path of the tool; means for mounting the eccentric for bodily movement toward and away from the path of the work; and power mechanism acting periodically on the eccentric to move it bodily toward and away from the path of the work, thereby to augment or reduce movement of the cam shaft toward the path of the work.

2. Apparatus for severing successive longitudinal sections from continuously moving elongated work such as pipe, tube, rod and the like comprising a cutting tool; guides for guiding the work in a normal path; a rotary support for said cutting tool adapted to move said tool in an orbital path approaching but not intersecting the normal path of the work; a cam for periodically deflecting the work from its normal path into the path of the cutting tool; means including a shaft on which the cam is mounted for driving the cam at the same rotational speed as but in the opposite angular direction from the rotary support for the cutting tool; means driven in synchronism with the rotary support for the cutting tool for periodically displacing the cam shaft in a lateral direction toward the path of the work to enable the cam to deflect the work into the path of the tool; and power mechanism acting on said last named means to augment or reduce the displacement of the cam shaft toward the path of the work.

3. Apparatus for severing successive longitudinal sections from continuously moving elongated work such as pipe, tube, rod and the like comprising a cutting tool; guides for guiding the work in a normal path; a rotary support for said cutting tool adapted to move said tool in an orbital path approaching but not intersecting the normal path of the work; a cam for periodically deflecting the work from its normal path into the path of the cutting tool; means including a shaft on which the cam is mounted for driving the cam at the same rotational speed as but in the opposite direction from the rotary support for the cutting tool; means including an eccentric driven in synchronism with the rotary support for the cutting tool for periodically displacing the cam shaft in a lateral direction toward the path of the work to enable the cam to deflect the work into the path of the tool; and power mechanism acting on the eccentric periodically to augment or reduce the displacement of the cam shaft toward the path of the work.

4. Apparatus for severing successive longitudinal sections from continuously moving elongated work such as pipe, tube, rod and the like comprising a cutting tool; guides for guiding the work in a normal path; a rotary support for said cutting tool adapted to move said tool in an orbital path approaching but not intersecting the normal path of the work; means for driving said rotary support; a cam for periodically deflecting the work from its normal path into the path of the cutting tool; means including a shaft on which the cam is mounted for driving the cam at the same rotational speed as but in the opposite angular direction from the rotary support for the cutting tool; means driven in synchronism with the rotary support for the cutting tool for periodically moving the cam shaft toward the path of the work to enable the cam to deflect the work into the path of the tool; power mechanism acting on said last named means to augment or reduce movement of the cam shaft toward the path of the work; a cam for controlling the operation of said power mechanism driven from the drive means for said rotary support; and change speed gearing interposed in the drive for said cam for varying the frequency of operation of said power mechanism with respect to the rotation of said rotary support.

5. Apparatus for severing successive longitudinal sections from continuously moving elongated work such as pipe, tube, rod and the like comprising a cutting tool; guides for guiding the work in a normal path; a rotary support for said cutting tool adapted to move said tool in an orbital path approaching but not intersecting the normal path of the work; means for driving said rotary support; a cam for periodically deflecting the work from its normal path into the path of the cutting tool; means including a shaft on which the cam is mounted for driving the cam at the same rotational speed as but in the opposite direction from the rotary support for the cutting tool; a housing within which said shaft is supported; means for mounting said housing for bodily movement toward and away from the path of the work; fluid pressure mechanism for bodily moving said housing toward and away from the path of the work; a cam for controlling the operation of said fluid pressure mechanism driven from the drive means for said rotary support; and change speed gearing interposed in the drive for said cam for varying the frequency of operation of said power mechanism with respect to the rotation of said rotary support.

6. Apparatus for severing successive longitudinal sections from continuously moving elongated work such as pipe, tube, rod and the like comprising a cutting tool; guides for guiding the work in a normal path; a rotary support for said cutting tool adapted to move said tool in an orbital path approaching but not intersecting the normal path of the work; means for driving said rotary support; a cam for periodically deflecting the work from its normal path into the path of the cutting tool; means including a shaft on which the cam is mounted for driving the cam at the same rotational speed as but in the opposite direction from the rotary support for the cutting tool; a housing within which said shaft is supported; means for mounting said housing for bodily movement toward and away from the path of the work; power mechanism for bodily moving said housing toward and away from the path of the work; and means for controlling the operation of said power mechanism driven from the drive means for said rotary support.

7. In a flying cut-off mechanism, frame structure; a pivot pin on the frame structure; an eccentric housing supported by the pivot pin, said eccentric housing being susceptible of bodily movement about the axis of the pivot pin; an eccentric within the eccentric housing; a shaft carried by the eccentric; a work-deflecting cam connected to the shaft; a power train for driving the shaft; and, for modifying the action of the cam, means for moving the eccentric housing in timed relation to the cam.

8. Flying cut-off mechanism as in claim 7 in which the means for moving the eccentric housing includes a power mechanism acting on the eccentric housing.

9. Flying cut-off mechanism as in claim 8 in which the power mechanism takes the form of a fluid-pressure motor.

10. Flying cut-off mechanism as in claim 9 in which the fluid-pressure motor is adjustably mounted on the frame structure.

11. In a flying cut-off mechanism, frame structure; pivot means on the frame structure; a shaft housing supported by the pivot means, said shaft housing being susceptible of bodily movement about the axis of the pivot means; a shaft within the shaft housing; a work-deflecting element connected to the shaft, said work-deflecting element being located exteriorly of the shaft housing; a power train for driving the shaft and the work-deflecting element; and, for modifying the action of the work-deflecting element, a fluid-pressure motor coupled to the shaft housing in such manner as to rock the shaft housing in timed relation to the work-deflecting element.

12. Flying cut-off mechanism as in claim 11 in which the fluid-pressure motor is controlled by a cam-actuated valve.

13. Flying cut-off mechanism as in claim 12 in which the power train driving the work-deflecting element operates the cam-actuated valve controlling the fluid pressure motor.

14. In a flying cut-off mechanism, frame structure; pivot means on the frame structure; a shaft housing supported by the pivot means, said shaft housing being susceptible of pivotal movement about the axis of the pivot means; a shaft within the shaft housing; a work-deflecting element on the shaft, said work-deflecting element being located exteriorly of the shaft housing; a power train for driving the shaft and the work-deflecting element; and, for modifying the action of the work-deflecting element, means driven from the same power train for pivotally moving the shaft housing in timed relation to the work-deflecting element.

15. Flying cut-off mechanism as in claim 14 in which an eccentric intervenes between the shaft and the shaft housing.

16. Flying cut-off mechanism as in claim 15 in which the eccentric is rotated within the shaft housing by means of an epicyclic gearing system.

17. Flying cut-off mechanism as in claim 16 in which the shaft is provided with a drive gear, the shaft housing is provided with an internal gear, and the eccentric is provided with a pinion that meshes both with the internal gear on the shaft housing and with the drive gear on the shaft.

18. In a flying cut-off mechanism, frame structure; a tool mounted on the frame structure for movement in an orbital path; work-deflecting means for periodically urging the work toward the tool; means supporting the work-deflecting means, said supporting means being pivoted to the frame structure; and, for periodically rocking the means supporting the work-deflecting means, cylinder-and-piston means coupled to the means supporting the work-deflecting means.

19. A flying cut-off mechanism as in claim 18 in which the cylinder-and-piston means is supported from the frame structure for movement relative to the frame structure.

20. A flying cut-off mechanism as in claim 19 in which the cylinder-and-piston means is carried by a link pivotally mounted at one end on the frame structure.

21. A flying cut-off mechanism as in claim 20 in which the other end of the pivotally mounted link is connected to adjusting means on the frame structure.

22. Apparatus for severing successive longitudinal sections from continuously moving elongated work such as pipe, tube, rod and the like comprising a cutting tool; guides for guiding the work in a normal path; a rotary support for said cutting tool adapted to move said tool in an orbital path approaching but not intersecting the normal path of the work; a cam for periodically deflecting the work from its normal path into the path of the cutting tool; means including a shaft on which the cam is mounted for driving the cam at substantially the same rotational speed as but in the opposite angular direction from the rotary support for the cutting tool; an eccentric driven in synchronism with the rotary support for the cutting tool for periodically displacing the cam shaft in a lateral direction toward the path of the work to enable the cam to deflect the work into the path of the tool; and power mechanism acting periodically to change the distance between the eccentric and the orbital path of the cutting tool.

References Cited in the file of this patent

UNITED STATES PATENTS

| Number | Name | Date |
| --- | --- | --- |
| 1,903,932 | Mueller | Apr. 18, 1933 |
| 2,332,013 | Rudert et al. | Oct. 19, 1943 |
| 2,618,047 | Mansell | Nov. 18, 1952 |